April 4, 1950
G. W. CRABTREE
2,503,030
HYDRAULIC SPRING CONTROL MEANS
AND THEIR MOUNTING ON VEHICLES
Filed May 18, 1946
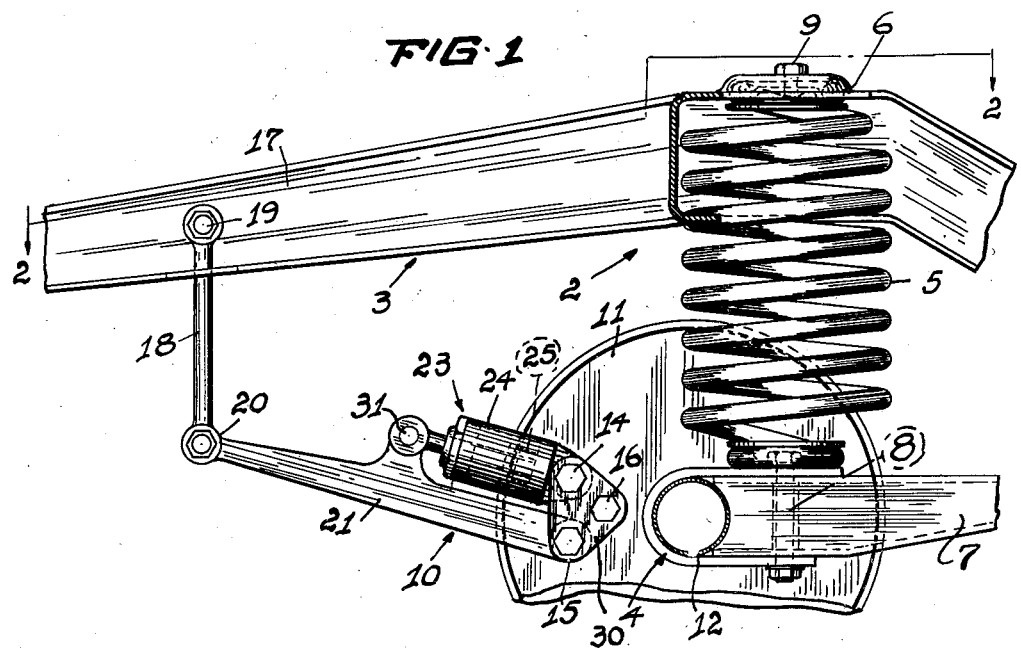
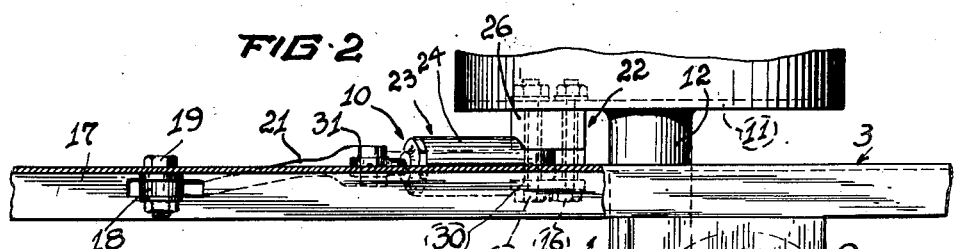
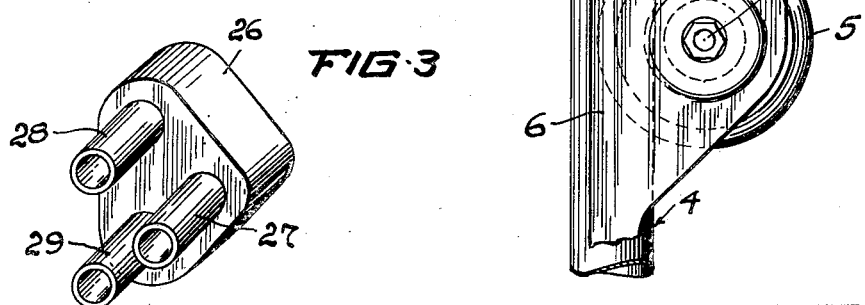
INVENTOR.
GEORGE W. CRABTREE
BY *Gustav A. Wolff*
ATT.

Patented Apr. 4, 1950

2,503,030

UNITED STATES PATENT OFFICE 2,503,030

HYDRAULIC SPRING CONTROL MEANS AND THEIR MOUNTING ON VEHICLES

George W. Crabtree, Cleveland Heights, Ohio

Application May 18, 1946, Serial No. 670,669

1 Claim. (Cl. 188—88)

The present invention relates in general to spring controlling means and, more particularly, to hydraulic spring controlling means for checking or retarding movements of vehicle springs when under compression and their reflex actions under rebound. Hydraulic spring controlling means, especially those of the cylinder-piston type, are commonly subjected to excessive wear in localized areas of their cylinders and pistons, as the direction of forces to be checked commonly intersects the axes of these cylinders and pistons.

The general object of this invention is the provision of an improved hydraulic spring controlling device of the cylinder-piston type constructed to automatically align its cylinder and piston with the forces to be checked to eliminate localized wear in cylinder and piston and insure highest efficiency during extensive use of the device.

This general object according to the invention is attained by detachably mounting the cylinder of a hydraulic spring controlling device on a pivot to permit automatic alignment of the cylinder with the forces applied to the piston of the device.

Another object of the invention therefore is the provision of an improved hydraulic spring controlling device embodying a detachably and pivotally mounted cylinder to permit its automatic alignment with the forces applied to the piston on the device. This latter object according to the invention is attained by a hydraulic spring controlling device of the cylinder-piston type in which a separate base pivotally supports, in laterally spaced relation, the operating arm and the cylinder of a hydraulic checking device to effect swinging movements of the operating arm and cylinder in different arcs, and in which the piston of the hydraulic checking device is pivotally coupled with the operating arm to effect actuation of the hydraulic checking device by relative movements between two yieldingly spaced members, one of which mounts the base of the spring controlling device and the other one of which is linked with the pivotally supported operating arm of the spring controlling device.

A further object of the invention therefore is the provision of an improved hydraulic spring controlling device having a base pivotally supporting an operating arm and a hydraulic checking device of the cylinder-piston type having its cylinder pivoted to the base in spaced relation with respect to the operating arm and having its piston pivotally connected with the operating arm.

Still another object of the invention is the provision of an improved hydraulic spring controlling device of the cylinder-piston type constructed as a unitary structure adapted to be readily attached to and coupled with yieldingly spaced members such as the frame and chassis of an automobile.

Still further objects and novel features of the invention by which the foregoing and other desirable objects and superiorities are attained, are clearly set forth in the following specification and the appended claim; and several preferred forms of embodiment of the invention are hereinafter shown with reference to the accompanying drawings forming part of the specification.

In the drawings:

Fig. 1 is a longitudinal sectional view showing a rear chassis portion of a vehicle, a spring member yieldingly supporting the rear frame portion of the vehicle, and a hydraulic controlling member for the spring built in accordance with the invention.

Fig. 2 is a fragmentary sectional view on line 2—2 of Fig. 1.

Fig. 3 is an enlarged perspective view of the supporting base of the hydraulic controlling member.

Referring now in detail to the exemplified form of the invention shown in Figs. 1 and 2 of the drawings, reference numeral 2 denotes the rear chassis portion of an automobile, the frame 3 of which is yieldingly supported on rear axle 4 by a coil spring 5. Thus spring 5 supports the cross member 6 of frame 3 and rests on radius rod 7 of rear axle 4, and bolts 8 and 9 secure the spring to the respective parts.

Movements between frame 3 and rear axle 4 and therewith the reflex actions of spring 5 are checked and controlled by a hydraulic spring controlling device 10. This device is rigidly attached to the circular flange 11 of axle housing 12 by bolts 14, 15 and 16 and is hingedly connected to the side member 17 of frame 3 by a connecting member 18 which is pivoted to a bolt 19 on side member 17 and also pivoted to the end 20 of the operating lever 21 of hydraulic spring controlling device 10.

The spring controlling device includes a base or bracket member 22, the above referred to operating lever 21 which is pivoted to the bracket member, and a hydraulic checking member 23 with a cylinder 24 pivoted to bracket member 22, and a piston 25 pivoted to operating lever 21 between the opposite ends thereof. Base or bracket member 22 embodies a base portion 26, with three parallelly arranged studs 27, 28, 29 extended therefrom, and a plate 30 which rests on said studs and is secured to said base by the bolts 14, 15 and 16. These bolts extend through plate 30, studs 27, 28, 29 and base portion 26 and rigidly secure bracket member 22 to flange 11 of axle housing 12. The studs 28 and 29, preferably positioned one above each other, pivotally support the operating lever 21 and the cylinder 24 of hydraulic checking member 23 which checks movements between frame 3 and rear axle 4 transmitted by member 18 to operating lever 21, effecting shifting of piston 25 in cylinder 24, as lever 21 and cylinder 24 swing in different arcs. The piston 25 is at 31 pivoted to operating lever 21 and permits proper alignment of piston and cylinder during checking operations, in which piston 25 frictionally displaces the liquid in cylinder 24.

In the hydraulic spring controlling device described above, forces transferred to the hydraulic checking member, are always aligned with the axis of said member and, consequently, localized wear and tear on piston and cylinder are eliminated so that the controlling member operates during long extensive use with highest efficiency. The rate of movement of piston 25 is controlled by the operating lever 21 and the pivot 31 for piston 25, as will readily be seen from inspection of Fig. 1 of the drawings.

Having thus described my invention, what I claim is:

A device for checking compression and reflex action of the rear spring of an automobile having a frame and a rear axle yieldingly coupled with each other by a spring comprising a bracket member secured to the rear axle, said bracket member including two parallel studs arranged one above the other, a hydraulic spring controlling device of the cylinder piston type having its cylinder pivotally supported on one of the studs of said bracket member, an operating lever pivoted to the other one of said studs, a link connecting the free end of said lever with the frame of said automobile, and means on said lever arranged between the opposite ends thereof pivotally connecting the piston of said hydraulic spring controlling device with the said lever between its opposite ends.

GEORGE W. CRABTREE.

REFERENCES CITED

The following references are of record in the file of this patent:

UNITED STATES PATENTS

| Number | Name | Date |
|---|---|---|
| 927,048 | House | July 6, 1909 |
| 1,527,592 | Livezey | Feb. 24, 1925 |
| 1,563,169 | Daniel et al. | Nov. 24, 1925 |
| 1,567,517 | Kisbey | Dec. 29, 1925 |
| 1,848,783 | Horstmann | Mar. 8, 1932 |
| 2,299,935 | Slack et al. | Oct. 27, 1942 |